May 15, 1962
C. J. DANIELS
3,034,749
ARRESTING MEANS FOR MOVING OBJECTS
Filed Feb. 26, 1960
2 Sheets-Sheet 1
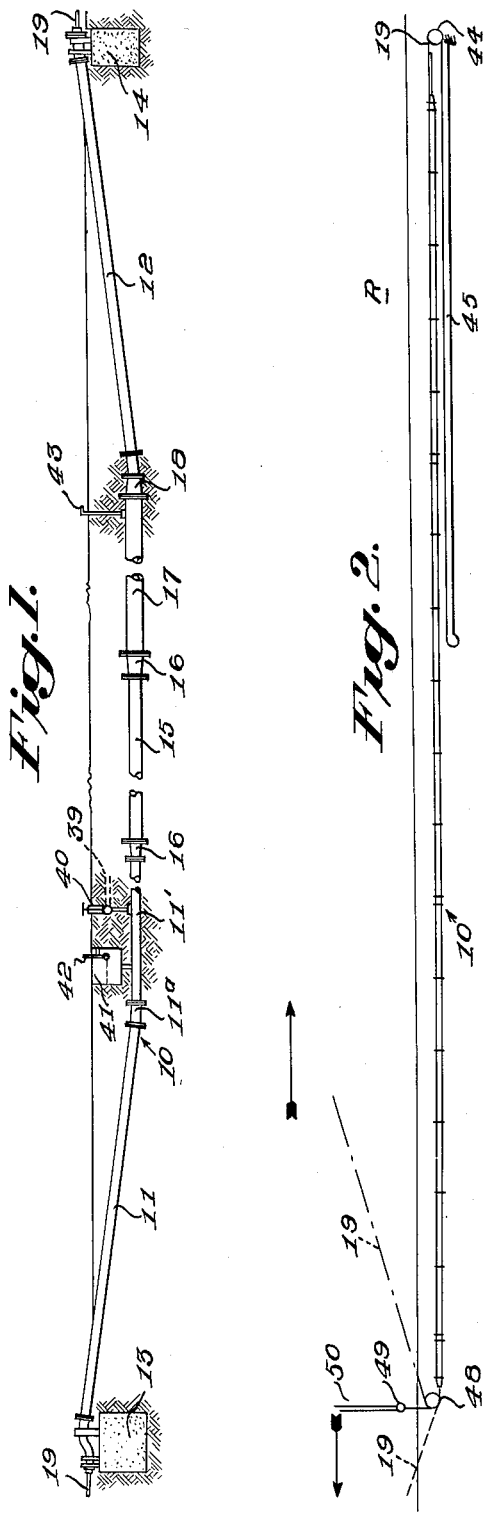
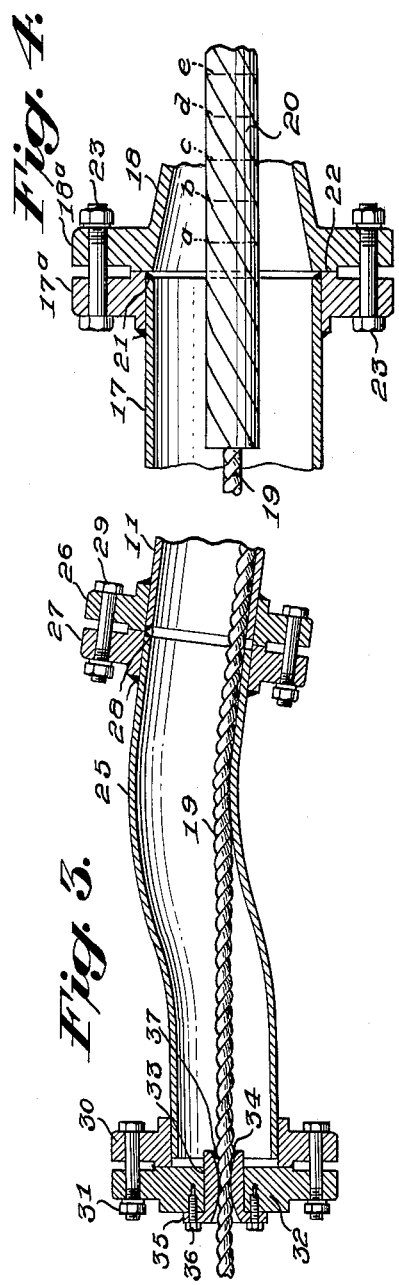
INVENTOR
Charles J. Daniels.
BY Herbert M Birch
ATTORNEY

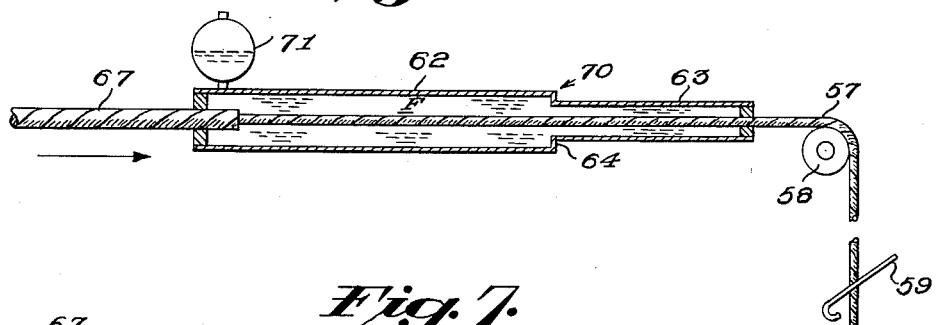
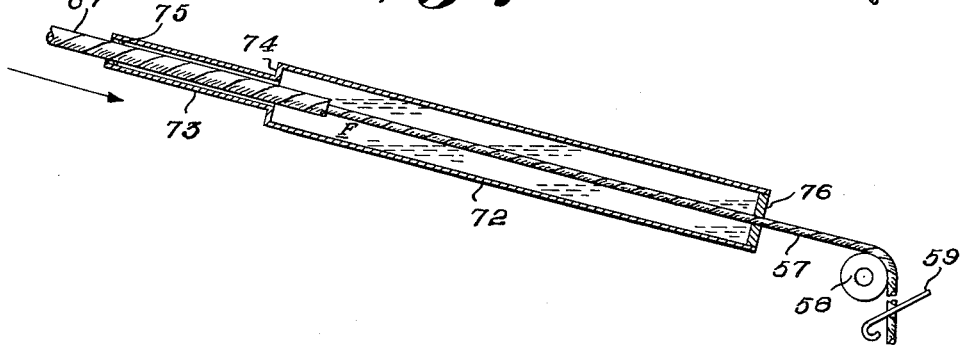

United States Patent Office 3,034,749
Patented May 15, 1962

3,034,749
ARRESTING MEANS FOR MOVING OBJECTS
Charles J. Daniels, Wilmington, Del., assignor to All American Engineering Company, Wilmington, Del., a corporation of Delaware
Filed Feb. 26, 1960, Ser. No. 11,247
2 Claims. (Cl. 244—110)

This invention relates to means for decelerating moving objects and is a continuation-in-part of my co-pending application Serial No. 602,860, filed August 8, 1956, now abandoned and assigned to the assignee of the present invention.

The invention is more particularly concerned with object arresting means characterized by an elongated tube having a fluid therein, together with a trailing elongated flexible member, such as a cable movable axially of the tube under action of a moving object and wherein a motion arresting force is provided by a skin friction between the cable and fluid upon relative movement thereof, in the tube.

A primary object of the invention is the provision of an elongated tube having a fluid therein together with a trailing cable movably disposed within the tube, and wherein the tube is of variable diameter for variable reaction between the fluid and the surface of the cable with corresponding resistance to movement of the cable through the tube as effected by skin friction between the fluid and the cable.

A further object of the invention is the provision of an elongated tube having a fluid therein, including a cable section connected to an arrest cable, and a trailing cable connected to said arrest cable connecting section movably disposed within the tube, and wherein the trailing cable is of a relatively larger diameter than said arrest cable connecting section for a variable reaction between the fluid and the trailing cable through the tube as effected by skin friction between the fluid and the trailing cable.

A still further object of the invention is the provision of structure as set forth immediately above, wherein the tube is also of variable diameter.

Other objects and advantages of the invention will become apparent in the course of the following detailed description taken in connection with the accompanying drawings, wherein:

FIGURE 1 is a foreshortened vertical sectional view showing the general layout of a tube or conduit arrangement on one side of a runway.

FIGURE 2 is a schematic top plan view of the arrangement in FIGURE 1.

FIGURE 3 is an enlarged vertical sectional view of the tube structure of FIGURE 1 at the arresting end thereof.

FIGURE 4 is an enlarged vertical sectional view of the tube structure at a joint between adjacent ends of a pair of tubes of different diameters and further showing a section of the arresting cable as it leads from a relatively large diameter of the last section of the arrest tube with respect to the leading arrest tube sections.

FIGURES 5 to 7, inclusive, are vertical longitudinal sectional views of different forms of tube sections for operative embodiment in the layout of FIGURE 1 and disclosing different methods of operation of the invention.

Referring now in detail to the drawings, and first to FIGURES 1 to 4 thereof, a conduit 10 is disposed at each side of a runway R only one of which conduits is shown to conserve space. The conduit 10 comprises a plurality of sections of different diameters. As shown, the conduit embodies tube sections 11 and 12 respectively, disposed at the arrest and retrieve or forward end rearward ends of the arrest conduit sections and which for the purpose of the present invention may be for example six inches in diameter. Since the complete conduit 10 is preferably disposed underground as shown, the tube sections 11 and 12 are inclined downwardly from foundations 13 and 14 on which the outer ends of the tube sections 11 and 12 are supported.

A second tube section 11' is horizontally disposed underground and one end thereof is connected to the adjacent end of section 11 by means of a flanged coupling 11a. The opposite end of tube section 11' is connected to one end of a horizontal tube section 15, which may be for example, of eight inches diameter as by means of a reduction coupling 16. The opposite end of tube section 15 is by means of a similar reduction coupling 16 connected to one end of a relatively larger tube section 17, which may be, for example, ten inches in diameter and the opposite end of the tube section 17 is connected by reduction coupling 18 to the adjacent end of the relatively smaller inclined tube section 12. A cable 19 extends through the conduit 10 and includes an elongated relatively larger section 20 for a purpose later to appear.

The conduit 10 in accordance with the principles of the present invention is adapted to be filled with fluid, preferably water or water and anti-freeze solution, and, accordingly, the several connections between the tube sections are fluid-tight.

One of the joints as between tube section 17 and reduction coupling 18 is shown in detail in FIGURE 4 and wherein it will be seen that a flange 18a on the coupling 18 opposes a flange 17a at the adjacent end of tube section 17 and which is welded thereto as indicated at 21. The flanges 17a and 18a have a fluid-tight contact as at 22 at which point a gasket may be disposed and the flanges are drawn into operative contact by means of bolts 23.

The remaining joints between adjacent tube sections are preferably likewise constructed.

The arresting or forward end of the conduit 10 is provided with a special connector for providing for smooth uninterrupted movement of the cable 19 from the inclined tube section 11 to a horizontal position, that is to prevent cable kinking. Such connector is shown in detail in FIGURE 3, and which comprises a tube 25 of generally ogee form in the provision of a dip section whose one end is connected to the adjacent end of the tube section 11 by cooperating flanges 26 and 27 secured to the tube section 11 and tube 25, as by welding 28. The flanges 26 and 27 are drawn into contact by bolts 29, similarly to the flange and bolt structure in FIGURE 4. The opposite end of the tube 25 has welded thereto a flange 30 to which is secured by bolts as at 31, a cap plate 32. The cap plate 32 is provided with a relatively large axial bore 33 in which is disposed a split bushing 34 having a flange 35 secured to the cap plate as by bolts 36.

As is clearly shown in FIGURE 3, the bushing 34 is provided with a bore 37 whose wall is axially convex, thereby providing for smooth transition of the cable 19 from the tube 25. A fluid supply line 39 emanates from any suitable source and the line communicates with the conduit 10 through a suitable supply valve 40.

The conduit 10 is further provided with a sump 41, with which is operatively associated a fluid level indicator 42. As indicated in FIGURE 1 the valve 40 and sump 41 are preferably associated with tube section 11' while the largest tube section 18 is provided with a U-shaped vent means 43.

The diagrammatic view in FIGURE 2 shows the conduit at one side of the runway K and wherein it will be seen that the cable 19 at the retrieving end of the conduit or energy absorber 10 passes over a fairlead sheave 44 and forms into a loop 45. At the arresting end of the conduit 10, the cable 19 extends over a sheave 48 and may be connected as at 49 to adjacent ends of deck pendants 50 whose opposite ends are similarly connected to a corresponding cable at the opposite side of the runway, or the cable 19 may extend in either dot-and-dash line direction for engaging objects to be delivered or picked up, by a plane traveling in the directions indicated by the respective arrows.

The energy absorbing capacity of the conduit 10 and cable 19 movably disposed therein is effected by the interaction between the cable 19 including the elongated member 20 and the fluid in the conduit, that is, skin friction, and the arresting capacity of such friction is dependent upon the surface area of the cable, its associated member 20 and the relative rate of movement between the same and the surrounding fluid. The member 20 comprises another flexible body, such as a cable of relatively larger diameter than cable 19, said member having sections *a*, *b*, *c*, *d* and *e*, which may be cut-off as required for drag adjustments by the installation engineer.

For a better understanding of the energy absorbing principle as effected by friction between a body of fluid and a cable movable therein, reference will now be had to diagrammatic FIGURES 5 to 7 in which are respectively disclosed different tube and cable structures, any of which may be embodied in the conduit and cable construction of FIGURE 1.

According to FIGURE 5, the tube 61 includes an end section 62 of a relatively large diameter and an opposite end section 63 of relatively small diameter providing a radial shoulder 64 intermediate the ends of the tube. The tube 61 is provided in its opposite ends with bushings 65 and 66; and the arresting cable 57 extends through the bushing 66 and is connected with a relatively larger cable 67 whose advance end extends through the bushing 65.

During arrestment the large cable 67 is drawn into the tube 61 and its surface, which is substantially greater than the surface of arresting cable 57, reacts with the fluid in the tube to provide skin friction, thereby tending to increase the tension in the arresting cable. The larger drag cable 67 may enter the reduced section 63 of the tube, wherein the clearance between the tube and the cable is such as to interfere with the natural formation of the skin friction principle, thereby further increasing the drag on the arresting cable. Control of the arresting cable tension is attained by the selection of the proper tube step-down, tube length and size of the cable. The tube is preferably provided with a reservoir 68 having a pressure relief valve 69.

According to the embodiment of FIGURE 6, the tube 70 is of the same general form as tube 61 including the sections 62 and 63 and the radial shoulder 64. This embodiment also includes the arresting cable 57 and the larger diameter cable 67. In this embodiment, however, the larger diameter tube section 62 is provided with an accumulator 71. In operation, retracting movement of the cable 57 draws this larger cable 67 through the tube and as the end of the larger cable approaches the smaller end of the tube, fluid F will be caused to flow from the smaller section 63 in opposition to the movement of the arresting cable and into the accumulator 71. The relative velocity of the fluid past the cable 67 is thereby increased with a resulting higher skin friction drag on the arresting cable 57. Control is attained by selection of proper cable size and length, and tube sizes. For example, the diameter and length of the drag cable section 67 may be regulated by the installer of this machine as in the first embodiment, see FIGURE 4.

According to the embodiment of FIGURE 7 the tube includes a major section 72 and a minor section 73 whose common axis is inclined to the horizontal with the major section lowermost and the minor section uppermost, and wherein a radial shoulder 74 exists at the adjacent ends of the sections. In this form, the arresting cable similarly to FIGURES 7 and 8 is attached to a flexible arrest member of a relatively larger diameter, such as the cable 67. Both ends of the tube are sealed as by bushings 75 and 76 and the tube is filled with fluid to a normal level below the junction of the two tube sections 72 and 73. With this construction, as arrestment progresses the larger cable 67 is pulled forwardly with a resulting displacement of fluid and causing same to flow back into the unfilled part of the tube. This increases the relative velocity of the fluid with respect to the larger elongated flexible arrest member or cable 67 and accordingly also increases the skin friction drag on the arresting cable 57 connected thereto. Control is attained upon selection of proper tube dimensions, arrest cable and drag cable dimensions and fluid level.

Without further description it is believed that the present invention is clearly understandable to others authorized to practice the same. While only a few embodiments of the invention described and illustrated in detail, it is to be expressly understood that other combinations, modifications and arrangements of the parts which will now probably occur to others skilled in the art are to be considered a part hereof. To determine the scope of the present invention, reference should be had to the appended claims.

What I claim is:

1. Means for arresting the forward motion of an object including a deck pendant, said means comprising an elongated conduit having a retrieve end and an arrest end filled with liquid, said conduit comprising a plurality of tubes coupled together in axial alignment, each of said respective tubes having a progressively different internal diameter from the next adjacent axial aligned tube, reduction coupling means for connecting said different tubes in axial aligned end to end relation in the provision of a plurality of progressively stepped-down bore sections from the said retrieve end to the said arrest end, an arrest cable extending through said stepped-down tube bores and a relatively larger trailing cable connected to said arrest cable to provide an arresting means, operatively associated with said cable comprising a relatively large elongated cable, said relatively large elongated cable having severable sections, said arrest cable with said relatively larger trailing cable being connected to said deck pendant positioned to be engaged by an object to be arrested.

2. Means for decelerating a moving object on a runway surface comprising an elongated conduit having an arrest end and a retrieve end, a fluid in said conduit, said conduit being installed below said surface, and a cable extending across the runway and having an elongated enlarged trailing portion extending through said conduit and extending out of the retrieve end of the conduit, said conduit comprising a plurality of axially aligned tubes each having an internal bore of a different progressively tapering size from the other tubes, reduction coupler means for coupling said tubes together, said cable with said enlarged portion being movable in the respective different size bores of the said tubes when contacted by a moving object, thereby providing an energy absorbing force for resisting movement of the enlarged trailing portion of the cable through the conduit tubes, said respective coupler means and said respective tubes each having a flange on each of their respective opposite ends, and said coupler means having an inclined tubular section between the respective end flanges thereof terminating level to the runway surface.

References Cited in the file of this patent

UNITED STATES PATENTS

| | | |
|---|---|---|
| 731,116 | Myer | June 16, 1903 |
| 2,743,741 | Ord | May 1, 1956 |
| 2,777,653 | Cotton | Jan. 15, 1957 |
| 2,957,554 | Ballard et al. | Oct. 25, 1960 |

FOREIGN PATENTS

| | | |
|---|---|---|
| 661,813 | Great Britain | Nov. 28, 1951 |